(12) United States Patent
Okabe et al.

(10) Patent No.: US 11,679,536 B2
(45) Date of Patent: Jun. 20, 2023

(54) METHOD FOR MOLDING COMPOSITE MATERIAL BLADE, COMPOSITE MATERIAL BLADE, AND MOLDING DIE FOR COMPOSITE MATERIAL BLADE

(71) Applicant: MITSUBISHI HEAVY INDUSTRIES, LTD., Tokyo (JP)

(72) Inventors: Ryoji Okabe, Tokyo (JP); Masami Kamiya, Tokyo (JP); Kentaro Shindo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 588 days.

(21) Appl. No.: 16/616,763

(22) PCT Filed: Sep. 20, 2018

(86) PCT No.: PCT/JP2018/034755
§ 371 (c)(1),
(2) Date: Nov. 25, 2019

(87) PCT Pub. No.: WO2019/059260
PCT Pub. Date: Mar. 28, 2019

(65) Prior Publication Data
US 2021/0078217 A1    Mar. 18, 2021

(30) Foreign Application Priority Data
Sep. 25, 2017  (JP) .............................. JP2017-183782

(51) Int. Cl.
*B29C 44/18*  (2006.01)
*B29C 44/14*  (2006.01)
(Continued)

(52) U.S. Cl.
CPC .............. *B29C 44/14* (2013.01); *B29C 44/18* (2013.01); *B29C 44/3415* (2013.01);
(Continued)

(58) Field of Classification Search
CPC ........... F01D 5/18; B29C 44/44; B29C 44/18; B29D 99/0025; B29D 99/0028
See application file for complete search history.

(56) References Cited

U.S. PATENT DOCUMENTS 2,484,141 A * 10/1949 Alex ..................... B64C 27/473
                                                                  415/217.1
2,728,702 A * 12/1955 Simon ................ B29D 99/0025
                                                                    264/46.7
(Continued)

FOREIGN PATENT DOCUMENTS

DE           2109934         9/1972
DE    10 2008 022 548       11/2009
(Continued)

OTHER PUBLICATIONS

Office Action dated Jan. 5, 2021 in corresponding German Patent Application No. 112018005440.3, with English translation.
(Continued)

*Primary Examiner* — Andrew D Graham
(74) *Attorney, Agent, or Firm* — Wenderoth, Lind & Ponack, L.L.P.

(57) ABSTRACT

A composite material blade molding method is for molding a composite material blade by curing a prepreg. The composite material blade has a back-side blade member and a belly-side blade member which are superposed and joined. The composite material blade molding method includes: a lamination step for forming a back-side laminate in a back-side molding die and forming a belly-side laminate in a belly-side molding die; an inner surface cowl plate disposition step for disposing an inner surface cowl plate for maintaining an inner space formed by the back-side laminate and the belly-side laminate; a die mating step for die-mating the back-side molding die and the belly-side molding die and disposing a foaming agent in the inner space maintained (Continued)

US 11,679,536 B2

Page 2 by the inner surface cowl plate; and a curing step for heating and expanding the foaming agent and heat-curing the backside laminate and the belly-side laminate.

11 Claims, 7 Drawing Sheets

(51) Int. Cl.
  B29C 44/34 (2006.01)
  B29C 70/20 (2006.01)
  B29C 70/46 (2006.01)
  B29C 70/54 (2006.01)
  B29C 70/56 (2006.01)
  F01D 5/14 (2006.01)
  F01D 5/28 (2006.01)
  B29K 105/04 (2006.01)
  B29K 105/08 (2006.01)
  B29L 31/08 (2006.01)

(52) U.S. Cl.
  CPC ........... *B29C 70/202* (2013.01); *B29C 70/46* (2013.01); *B29C 70/541* (2013.01); *B29C 70/56* (2013.01); *F01D 5/147* (2013.01); *F01D 5/282* (2013.01); *B29K 2105/04* (2013.01); *B29K 2105/089* (2013.01); *B29L 2031/08* (2013.01); *F05D 2230/23* (2013.01); *F05D 2300/603* (2013.01)

(56) References Cited

U.S. PATENT DOCUMENTS

| | | | | |
|---|---|---|---|---|
| 2,945,262 | A * | 7/1960 | Petty | B29C 70/446 264/DIG. 41 |
| 3,008,859 | A * | 11/1961 | Smack | B29D 99/0028 264/45.2 |
| 3,205,288 | A * | 9/1965 | Bates | B29D 99/0028 264/254 |
| 4,268,571 | A * | 5/1981 | McCarthy | B29D 99/0025 428/307.3 |
| 4,335,182 | A * | 6/1982 | Brand | B29C 44/3496 428/319.3 |
| 4,377,272 | A * | 3/1983 | Waldeck | B29D 99/0025 249/160 |
| 4,471,020 | A * | 9/1984 | McCarthy | B29D 99/0025 264/257 |
| 4,521,354 | A * | 6/1985 | Engelke | B29C 44/385 264/DIG. 83 |
| 4,551,290 | A * | 11/1985 | Mizell | B29D 99/001 264/269 |
| 4,648,921 | A * | 3/1987 | Nutter, Jr. | B29C 70/86 29/889.6 |
| 4,810,167 | A * | 3/1989 | Spoltman | B32B 5/16 416/241 A |
| 4,892,462 | A * | 1/1990 | Barbier | B64C 27/473 416/241 A |
| 4,935,277 | A * | 6/1990 | Le Balc'h | B64C 27/473 428/116 |
| 5,096,384 | A * | 3/1992 | Immell | B29D 99/0025 29/889.6 |
| 5,129,787 | A * | 7/1992 | Violette | B29D 99/0028 416/241 A |
| 5,213,476 | A * | 5/1993 | Monroe | B29C 70/446 416/232 |
| 5,279,892 | A * | 1/1994 | Baldwin | B29C 70/08 442/281 |
| 5,340,280 | A * | 8/1994 | Schilling | F01D 5/3007 416/226 |
| 5,392,514 | A * | 2/1995 | Cook | B29D 99/0028 29/889.7 |
| 5,403,153 | A * | 4/1995 | Goetze | F01D 5/187 416/248 |
| 5,720,597 | A | 2/1998 | Wang et al. | |
| 5,960,249 | A * | 9/1999 | Ritter | B22F 3/1208 419/60 |
| 6,132,826 | A * | 10/2000 | Kawasaki | B29C 66/54 264/513 |
| 6,264,877 | B1 * | 7/2001 | Pallu De La Barriere | B29D 99/0028 264/516 |
| 8,007,624 | B2 * | 8/2011 | Stiesdal | B29C 33/505 156/286 |
| 9,266,289 | B2 * | 2/2016 | Gauchel | E06C 7/081 |
| 9,291,151 | B2 * | 3/2016 | Mironov | B29D 99/0028 |
| 9,403,335 | B2 * | 8/2016 | Madsen | B29D 99/0028 |
| 10,391,722 | B1 * | 8/2019 | Traustadottir | B29D 99/0025 |
| 11,292,219 | B2 * | 4/2022 | Okabe | F01D 5/147 |
| 2003/0116262 | A1 * | 6/2003 | Stiesdal | F03D 1/0675 156/245 |
| 2008/0152858 | A1 * | 6/2008 | Schreiber | B21D 53/78 428/68 |
| 2009/0072439 | A1 * | 3/2009 | Karem | B29D 99/0028 264/258 |
| 2010/0314028 | A1 * | 12/2010 | Hedges | B29C 70/342 156/305 |
| 2011/0116935 | A1 * | 5/2011 | Wansink | B29C 70/84 156/245 |
| 2011/0142679 | A1 * | 6/2011 | Bendel | B29C 66/721 156/382 |
| 2011/0243750 | A1 * | 10/2011 | Gruhn | B29D 99/0028 416/226 |
| 2012/0061007 | A1 * | 3/2012 | Gunther | B29C 70/30 156/94 |
| 2012/0093659 | A1 * | 4/2012 | Muschke | B29D 99/0028 264/266 |
| 2013/0101406 | A1 * | 4/2013 | Kweder | B29C 70/081 428/113 |
| 2013/0177422 | A1 * | 7/2013 | Bianchi | F01D 5/147 416/146 R |
| 2014/0083596 | A1 * | 3/2014 | Walker | B29C 44/44 156/78 |
| 2014/0119931 | A1 * | 5/2014 | Datta | B29C 70/443 416/223 R |
| 2014/0119937 | A1 * | 5/2014 | Fang | B29C 70/56 416/233 |
| 2014/0134422 | A1 * | 5/2014 | Kraatz | B32B 5/20 264/46.4 |
| 2014/0271217 | A1 * | 9/2014 | Baker | F03D 1/0683 416/226 |
| 2014/0311163 | A1 * | 10/2014 | Uskert | F01D 5/282 156/185 |
| 2015/0316028 | A1 * | 11/2015 | Brekenfeld | B29C 70/34 156/196 |
| 2016/0040651 | A1 * | 2/2016 | Yarbrough | F03D 1/0675 156/245 |
| 2016/0146184 | A1 * | 5/2016 | Caruso | F03D 1/0675 156/60 |
| 2016/0160837 | A1 * | 6/2016 | Geiger | F03D 1/0675 29/889.71 |
| 2016/0201480 | A1 * | 7/2016 | Foster | B29D 99/0028 415/200 |
| 2016/0279867 | A1 * | 9/2016 | Garm | B29C 66/12261 |
| 2016/0312762 | A1 * | 10/2016 | Quiring | F03D 1/0675 |
| 2017/0082089 | A1 * | 3/2017 | Yarbrough | F03D 13/10 |
| 2017/0204833 | A1 * | 7/2017 | Albert | B29D 99/0028 |
| 2017/0361507 | A1 * | 12/2017 | Bendel | B29D 99/0028 |
| 2018/0126687 | A1 * | 5/2018 | Amat | B32B 1/08 |
| 2018/0250895 | A1 * | 9/2018 | Wardropper | B29D 99/0028 |
| 2018/0339431 | A1 * | 11/2018 | Hahn | B29D 99/0028 |
| 2018/0370158 | A1 * | 12/2018 | Gallier | F01D 5/18 |
| 2019/0001534 | A1 * | 1/2019 | Tangager | B29C 41/02 |

(56) References Cited

U.S. PATENT DOCUMENTS

2019/0077096 A1* 3/2019 Albert .................. B29C 70/541
2019/0153996 A1* 5/2019 Tobin ...................... B29C 53/04

FOREIGN PATENT DOCUMENTS

| JP | 9-303104 | 11/1997 |
|----|----------|---------|
| WO | 2012/010331 | 1/2012 |

OTHER PUBLICATIONS

International Search Report dated Dec. 18, 2018 in International (PCT) Application No. PCT/JP2018/034755.

* cited by examiner

SURFACE SIDE

NEUTRAL PLANE SIDE

METHOD FOR MOLDING COMPOSITE MATERIAL BLADE, COMPOSITE MATERIAL BLADE, AND MOLDING DIE FOR COMPOSITE MATERIAL BLADE

TECHNICAL FIELD

The present invention relates to a method for molding a composite blade, a composite blade, and a molding die for a composite blade.

BACKGROUND ART

In the related art, as a composite blade, a gas turbine blade having an airfoil profile portion extending from a blade end toward a blade root is known (refer to, for example, Japanese Unexamined Patent Application Publication No. 09-303104). The airfoil profile portion has a metallic part in which a surface concavity is formed, and a foam part which is provided in the surface concavity of the metallic part, and the metallic part and the foam part are surrounded by a composite material skin and joined to the composite material skin. Further, the airfoil profile portion is provided with an erosion coating which covers the composite material skin.

SUMMARY OF INVENTION

Technical Problem

Incidentally, as the composite blade, there is a composite blade which does not include a metal part, and as such a composite blade, there is a composite blade in which a foaming agent is provided in the interior of a blade main body formed by laminating reinforcement fiber preform materials. The foaming agent is pressed toward a molding die for molding the composite blade from the interior side of the composite blade at the time of thermal curing, in order to mold a composite blade with high dimensional accuracy while suppressing the formation of voids which are generated in the blade main body.

However, in the composite blade, there is a case where at the time of thermal curing, the reinforcement fiber preform material of the laminated blade main body flows before the foaming agent expands, whereby undulation of the fibers occurs. Further, there is a case where at the time of the expansion of the foaming agent, the foaming agent is not appropriately filled in the interior of the blade main body and the thickness of the foaming agent becomes thin. In this manner, if the undulation of the fibers occurs or the thickness of the foaming agent becomes thin, the flexural rigidity of the composite blade and the natural frequency of the composite blade are lowered. If the natural frequency of the composite blade is lowered, in order to satisfy the required flexural rigidity, the blade thickness of the composite blade should be increased, and thus there is a problem in that aerodynamic performance is lowered. Further, in a case where the undulation of the fibers and an individual difference in the thickness of the foaming agent occur, there is also a problem in that variation in the natural frequency of the composite blade increases, making it difficult to perform detuning to avoid a resonance point.

Therefore, the present invention has an object to provide a method for molding a composite blade, a composite blade, and a molding die for a composite blade, in which it is possible to mold a high-quality composite blade which satisfies the required performance while attaining a reduction in weight.

Solution to Problem

According to an aspect of the present invention, there is provided a method for molding a composite blade, in which a composite blade made of a composite material is molded by curing a reinforcement fiber preform material in which reinforcement fibers are impregnated with resin, and in the composite blade, a suction-side part which is a part on a back side and a pressure-side part which becomes a belly side are superposed on each other and joined together, the method including: a lay-up step of forming a suction-side laminate by laminating the reinforcement fiber preform material on a suction-side molding die for molding the suction-side part, and forming a pressure-side laminate by laminating the reinforcement fiber preform material on a pressure-side molding die for molding the pressure-side part; a space retaining part alignment step of disposing a space retaining part for retaining an internal space which is formed by superposing the suction-side laminate and the pressure-side laminate on each other; a mold set step of die-matching the suction-side molding die and the pressure-side molding die such that the suction-side laminate and the pressure-side laminate are superposed on each other, and disposing a foaming agent in the internal space retained by the space retaining part; and a curing step of pressing the suction-side laminate and the pressure-side laminate toward the suction-side molding die and the pressure-side molding die from inside by expanding the foaming agent through heating thereof, and heating and curing the suction-side laminate and the pressure-side laminate.

According to this configuration, the space retaining part is disposed, whereby it is possible to expand the foaming agent while thermally curing the suction-side laminate and the laminate in a state where the internal space is retained. For this reason, the internal space is retained by the space retaining part, and therefore, the flow of the reinforcement fiber preform materials of the suction-side laminate and the pressure-side laminate can be suppressed at the time of the thermal curing of the suction-side laminate and the pressure-side laminate. Therefore, it is possible to reduce undulation of the fibers which is generated in the suction-side part and the pressure-side part. Further, the internal space is retained by the space retaining part, and therefore, the internal space can be appropriately filled with the expanded foaming agent. Therefore, it is possible to appropriately adjust the thickness of the foaming agent. For this reason, it is possible to make the thickness in a lay-up direction of each of the suction-side part and the pressure-side part, which are the suction-side laminate and the pressure-side laminate after curing, into the required thickness. In this way, it is possible to set the flexural rigidity of the composite blade to the required flexural rigidity, and therefore, it is also possible to set the natural frequency of the composite blade to the required natural frequency.

Further, it is preferable that the space retaining part include a suction-side space retaining part which is disposed on the suction-side laminate, and a pressure-side space retaining part which is disposed on the pressure-side laminate.

According to this configuration, the space retaining part can be divided into the suction-side space retaining part and the pressure-side space retaining part, and therefore, it is possible to easily dispose the foaming agent in the internal space retained by the space retaining part.

Further, it is preferable that in the space retaining part alignment step, the suction-side space retaining part and the pressure-side space retaining part be caused to face each other, an adhesive be disposed between the suction-side space retaining part and the pressure-side space retaining part at each of both end parts of the suction-side space retaining part and the pressure-side space retaining part in a blade width direction of the composite blade, and the both end parts of the suction-side space retaining part and the pressure-side space retaining part be bonded to each other to form the space retaining part.

According to this configuration, the space retaining part can be integrally formed by bonding both end parts of the suction-side space retaining part and the pressure-side space retaining part with the adhesive.

Further, it is preferable that in each of the suction-side space retaining part and the pressure-side space retaining part, a thickness on a central portion side be made thinner than a thickness on an end part side in a blade width direction of the composite blade.

According to this configuration, the suction-side space retaining part and the pressure-side space retaining part become thinner toward the central portion from the end part in the blade width direction, whereby the rigidity in the blade width direction is kept constant, and in this way, the expansion pressure due to the foaming agent can be made uniform in the internal space.

Further, it is preferable that the space retaining part be provided on the entire surface along an inner surface of the internal space.

According to this configuration, it is possible for the entire inner surface of the internal space to be retained by the space retaining part. Further, the expanding foaming agent can press the entire inner surface of the internal space, which is formed by the suction-side laminate and the pressure-side laminate, through the space retaining part.

Further, it is preferable that as the space retaining part, a resin material or a cured composite material be used.

According to this configuration, it is possible to use an inexpensive resin material as the space retaining part. Further, a cured composite material which is the same as that of the composite blade can be used as the space retaining part, and therefore, it is possible to perform the thermal curing heating of the composite blade without changing the heating conditions.

Further, it is preferable that the space retaining part include, in a case where a cured composite material is used, a reinforcement fiber preform material in which a fiber direction of reinforcement fibers which are contained in the composite material has an orientation of ±45° with a blade length direction of the composite blade as a reference.

According to this configuration, it is possible to confer an elastic force to the space retaining part. In this way, the space retaining part is bent by the expansion pressure of the foaming agent due to the elastic force thereof, and therefore, the space retaining part can be suitably pressed against the suction-side laminate and the pressure-side laminate. As the reinforcement fibers, not only carbon fibers but also high-elastic resin fibers such as Kevlar (registered trademark) or Vectran (registered trademark) may be used as resin fibers having higher elasticity than the carbon fibers.

Further, it is preferable that the space retaining part have heat resistance capable of retaining the internal space between a heating start temperature in the curing step and a temperature at which the foaming agent expands.

According to this configuration, the internal space can be appropriately retained by the space retaining part until the foaming agent expands.

Further, it is preferable that in the space retaining part alignment step, in a blade width direction of the composite blade, both end parts of the space retaining part be disposed so as to be located closer to the internal space side than both end parts of the composite blade.

According to this configuration, even in a case where the space retaining part is provided, the suction-side laminate and the pressure-side laminate can be appropriately joined together at both end parts in the blade width direction.

Further, it is preferable that in the mold set step, the suction-side molding die be disposed on the lower side in a vertical direction and the pressure-side molding die is disposed on the upper side in the vertical direction.

According to this configuration, the suction-side laminate and the pressure-side laminate are disposed in a curved state which is convex downward. For this reason, hoop stress due to self-weight can be exerted on the suction-side laminate and the pressure-side laminate.

Further, it is preferable that each of the suction-side laminate and the pressure-side laminate have an innermost layer reinforcement fiber preform material which is provided on the internal space side, and that in a plane intersecting a lay-up direction of the reinforcement fiber preform material, an area of the innermost layer reinforcement fiber preform material be the largest area among the reinforcement fiber preform materials which are included in the suction-side laminate and the pressure-side laminate.

In this case, it is preferable that in the lay-up step, tension be applied to the innermost layer reinforcement fiber preform material in the in-plane direction intersecting the lay-up direction of the innermost layer reinforcement fiber preform material.

According to this configuration, by applying tension to the innermost layer reinforcement fiber preform material, it is possible to suppress the flow of the reinforcement fiber preform materials which are included in the suction-side laminate and the pressure-side laminate.

According to another aspect of the present invention, there is provided a method for molding a composite blade, in which a composite blade made of a composite material is molded by curing a reinforcement fiber preform material in which reinforcement fibers are impregnated with resin, and in the composite blade, a suction-side part which is as a part on a back side and a pressure-side part which becomes a belly side are superposed on each other and joined together, the method including: a lay-up step of forming a suction-side laminate by laminating the reinforcement fiber preform material on a suction-side molding die for molding the suction-side part and of forming a pressure-side laminate by laminating the reinforcement fiber preform material on a pressure-side molding die for molding the pressure-side part; a mold set step of die-matching the suction-side molding die and the pressure-side molding die such that the suction-side laminate and the pressure-side laminate are superposed on each other, and disposing a foaming agent in an internal space which is formed by superposing the suction-side laminate and the pressure-side laminate on each other; and a curing step of pressing the suction-side laminate and the pressure-side laminate toward the suction-side molding die and the pressure-side molding die from inside by expanding the foaming agent through heating thereof, and heating and curing the suction-side laminate and the pressure-side laminate, in which each of the suction-side laminate and the pressure-side laminate has an innermost layer reinforcement fiber preform material which is provided on the internal space side, and in a plane intersecting a lay-up direction of the reinforcement fiber preform material, an area of the innermost layer reinforcement fiber preform material is the largest area among the reinforcement fiber preform materials which are included in the suction-side laminate and the pressure-side laminate, and in the lay-up step, tension is applied to the innermost layer reinforcement fiber preform material in the in-plane direction intersecting the lay-up direction of the innermost layer reinforcement fiber preform material.

According to this configuration, by applying tension to the innermost layer reinforcement fiber preform material, it is possible to suppress the flow of the reinforcement fiber preform materials which are included in the suction-side laminate and the pressure-side laminate. For this reason, it is possible to reduce undulation of the fibers, which is generated in the suction-side part and the pressure-side part. In this way, it is possible to set the flexural rigidity of the composite blade to the required flexural rigidity, and therefore, it is also possible to set the natural frequency of the composite blade to the required natural frequency.

According to another aspect of the present invention, there is provided a composite blade made of a composite material which is molded by curing a reinforcement fiber preform material in which reinforcement fibers are impregnated with resin, the composite blade including: a suction-side part which is a part on a back side; a pressure-side part which becomes a belly side and is superposed on and joined to the suction-side part; a space retaining part for retaining an internal space which is formed by superposing the suction-side part and the pressure-side part on each other; and a foaming agent which is provided in an interior of the space retaining part in which in a blade width direction, both end parts of the space retaining part are located closer to the internal space side than both end parts of the suction-side part and the pressure-side part.

According to this configuration, the space retaining part is disposed, whereby it is possible to reduce the undulation of the fibers which is generated in the suction-side part and the pressure-side part, and the thickness of the foaming agent can be adjusted appropriately, and therefore, it is possible to provide a composite blade that satisfies the required performance (flexural rigidity and natural frequency). Further, even in a case where the space retaining part is provided, both end parts of the space retaining part are located on the internal space side, and therefore, the suction-side laminate (suction-side part) and the pressure-side laminate (pressure-side part) can be appropriately joined together at both end parts in the blade width direction.

Further, it is preferable that the space retaining part include a suction-side space retaining part which is disposed on the suction-side part, a pressure-side space retaining part which faces the suction-side space retaining part and is disposed on the pressure-side part, and an adhesive which is provided at each of both end parts of the suction-side space retaining part and the pressure-side space retaining part in a blade width direction and provided between the suction-side space retaining part and the pressure-side space retaining part.

According to this configuration, the space retaining part can be divided into the suction-side space retaining part and the pressure-side space retaining part, and therefore, at the time of the molding, it is possible to easily dispose the foaming agent in the internal space retained by the space retaining part.

Further, it is preferable that each of the suction-side part and the pressure-side part have an innermost layer reinforcement fiber preform material which is provided on the internal space side, and in a plane intersecting a lay-up direction of the reinforcement fiber preform material, an area of the innermost layer reinforcement fiber preform material is the largest area among the reinforcement fiber preform materials which are included in the suction-side part and the pressure-side part.

According to this configuration, at the time of the molding, by applying tension to the innermost layer reinforcement fiber preform material, it is possible to suppress the flow of the reinforcement fiber preform materials which are included in the suction-side laminate before the curing of the suction-side part and the pressure-side laminate before the curing of the pressure-side part. For this reason, it is possible to reduce the undulation of the fibers which is generated in the suction-side part and the pressure-side part.

According to another aspect of the present invention, there is provided a composite blade made of a composite material which is molded by curing a reinforcement fiber preform material in which reinforcement fibers are impregnated with resin, the composite blade including: a suction-side part which is a part on a back side; a pressure-side part which becomes a belly side and is superposed on and joined to the suction-side part; and a foaming agent which is provided in an internal space which is formed by superposing the suction-side part and the pressure-side part on each other, in which each of the suction-side part and the pressure-side part has an innermost layer reinforcement fiber preform material which is provided on the internal space side, and in a plane intersecting a lay-up direction of the reinforcement fiber preform material, an area of the innermost layer reinforcement fiber preform material is the largest area among the reinforcement fiber preform materials which are included in the suction-side part and the pressure-side part.

According to this configuration, at the time of the molding, by applying tension to the innermost layer reinforcement fiber preform material, it is possible to suppress the flow of the reinforcement fiber preform materials which are included in the suction-side laminate before the curing of the suction-side part and the pressure-side laminate before the curing of the pressure-side part. For this reason, it is possible to reduce the undulation of the fibers which is generated in the suction-side part and the pressure-side part.

According to another aspect of the present invention, there is provided a molding die for a composite blade, in which a composite blade made of a composite material is molded by curing a reinforcement fiber preform material in which reinforcement fibers are impregnated with resin, and in the composite blade, a suction-side part which is a part on a back side and a pressure-side part which becomes a belly side are superposed on each other and joined together, the molding die including: a suction-side molding die for laminating the reinforcement fiber preform material thereon and molding a suction-side laminate which is a suction-side part before molding; and a pressure-side molding die for laminating the reinforcement fiber preform material thereon and molding a pressure-side laminate which is a pressure-side part before molding, in which each of the suction-side laminate and the pressure-side laminate has an innermost layer reinforcement fiber preform material which is provided on a side of an internal space which is formed by superposing the suction-side laminate and the pressure-side laminate on each other, and in a plane intersecting a lay-up direction of the reinforcement fiber preform material, an area of the innermost layer reinforcement fiber preform material is the largest area among the reinforcement fiber preform materials which are included in the suction-side part and the pressure-side part, and each of the suction-side molding die and the pressure-side molding die includes a molding die main body on which the reinforcement fiber preform material is laminated, and a tension applying mechanism for applying tension to the innermost layer reinforcement fiber preform material in the in-plane direction intersecting a lay-up direction of the innermost layer reinforcement fiber preform material.

According to this configuration, it is possible for the tension applying mechanism to apply tension to the innermost layer reinforcement fiber preform material, and therefore, it is possible to suppress the flow of the reinforcement fiber preform materials which are included in the suction-side laminate and the pressure-side laminate. For this reason, it is possible to reduce the undulation of the fibers which is generated in the suction-side part and the pressure-side part.

DESCRIPTION OF EMBODIMENTS

Hereinafter, embodiments relating to the present invention will be described in detail based on the drawings. The present invention is not limited by the embodiments. Further, constituent elements that can be easily replaced by persons skilled in the art or are substantially the same are included in constituent elements in the following embodiments. Furthermore, the constituent elements described below can be appropriately combined, and in a case where there are a plurality of embodiments, it is also possible to combine the respective embodiments.

Embodiment 1

A method for molding a composite blade 10 according to this embodiment is a method for molding a blade by using a composite material composed of reinforcement fibers and resin. As the composite blade 10, for example, a turbine blade or a turbine vane which is used in a gas turbine, a gas turbine engine, or the like can be applied. In this embodiment, the composite blade 10 is described as being applied to a turbine blade. However, the method for molding the composite blade 10 is also applicable to a turbine vane.

Figure 1:
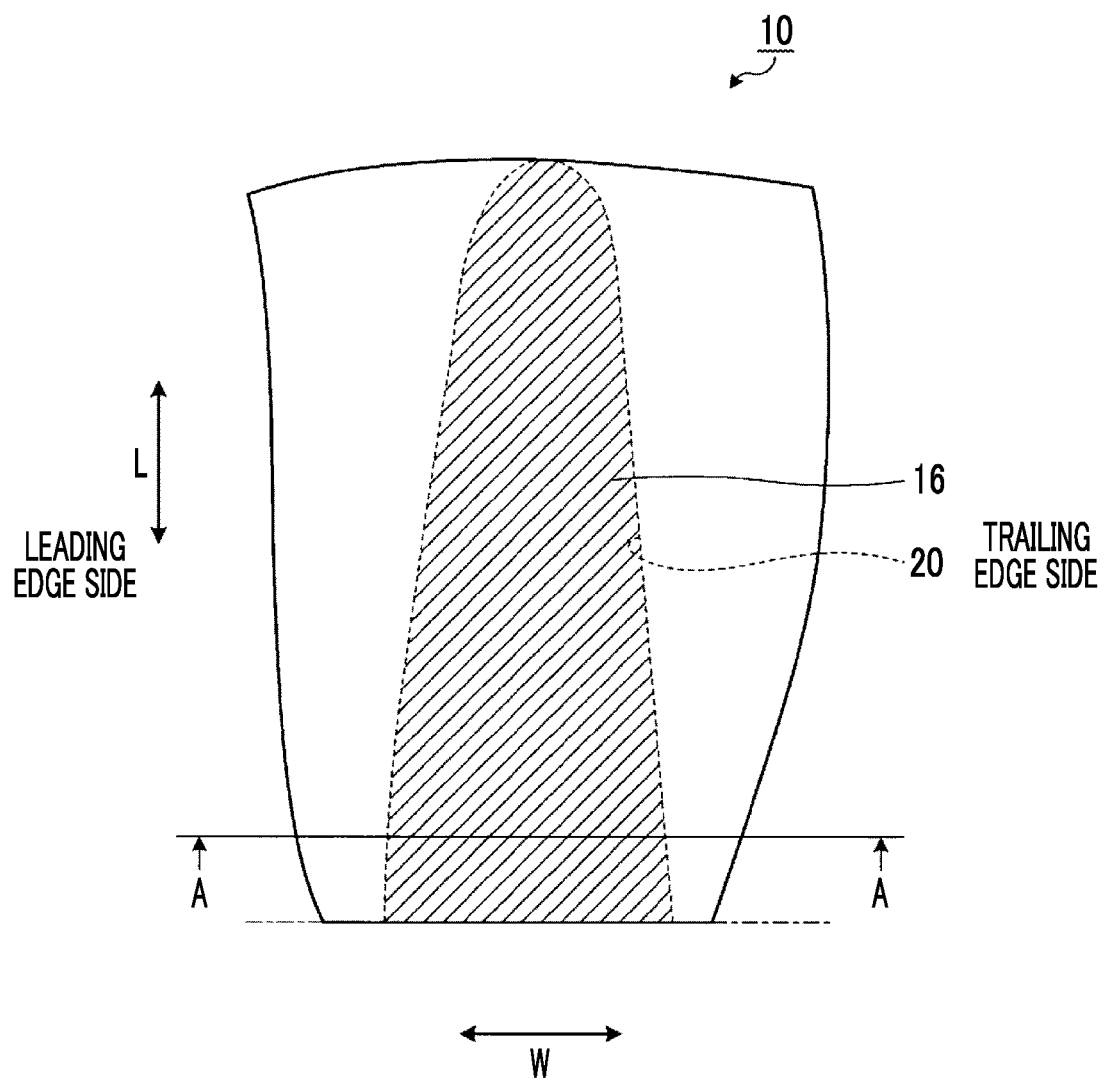
FIG. 1 is a plan view schematically showing a composite blade which is molded by a method for molding a composite blade according to Embodiment 1.
Figure 2:
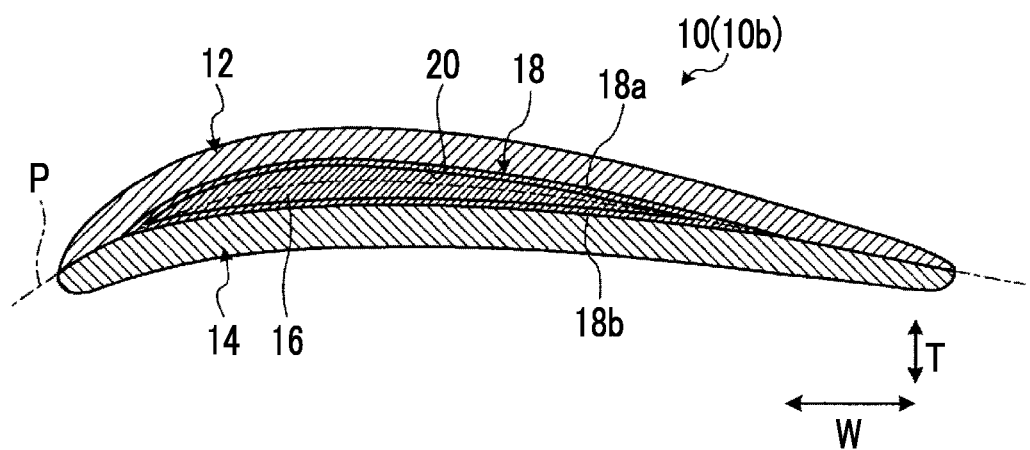
FIG. 2 is a cross-sectional view schematically showing a thick part of the composite blade according to Embodiment 1.
Figure 3:
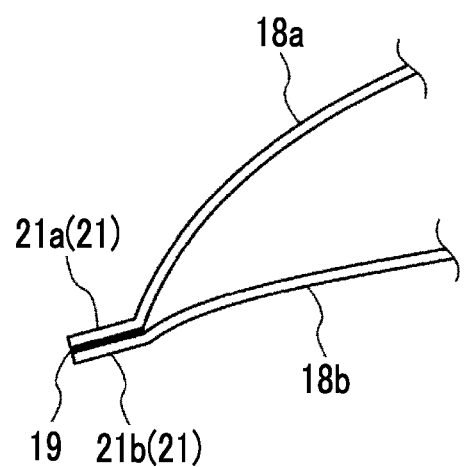
FIG. 3 is a schematic diagram of an example showing a part of an inner surface cowl plate of the composite blade according to Embodiment 1.
Figure 4:
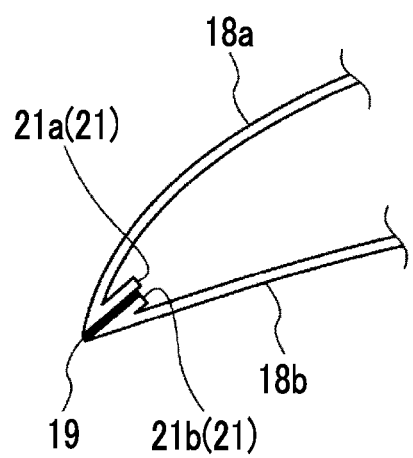
FIG. 4 is a schematic diagram of an example showing a part of the inner surface cowl plate of the composite blade according to Embodiment 1.
Figure 5:
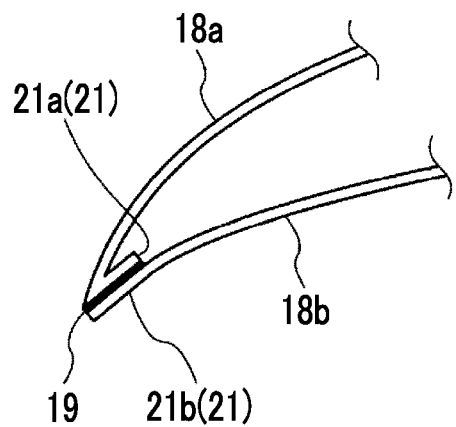
FIG. 5 is a schematic diagram of an example showing a part of the inner surface cowl plate of the composite blade according to Embodiment 1.
Figure 6:
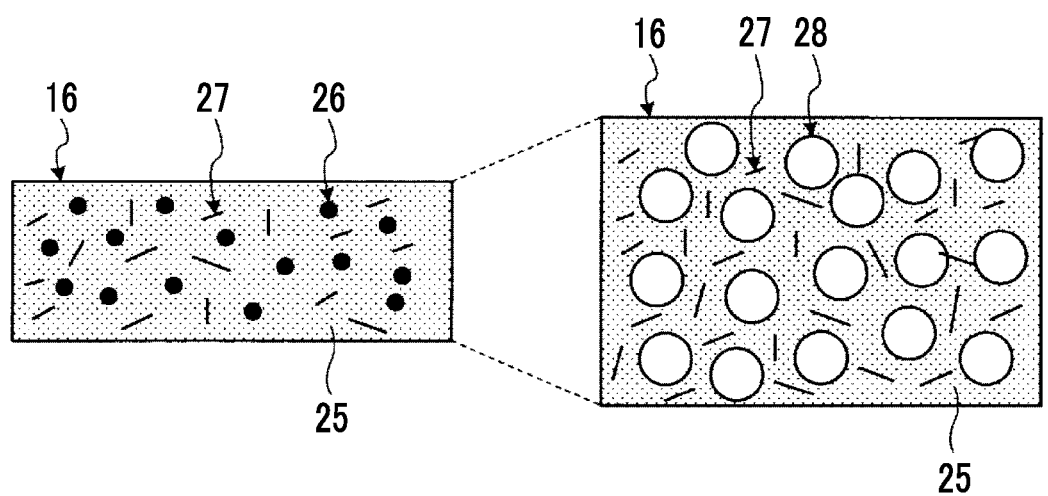
FIG. 6 is an explanatory diagram of a foaming agent which is used in the method for molding a composite blade according to Embodiment 1.
Figure 7:
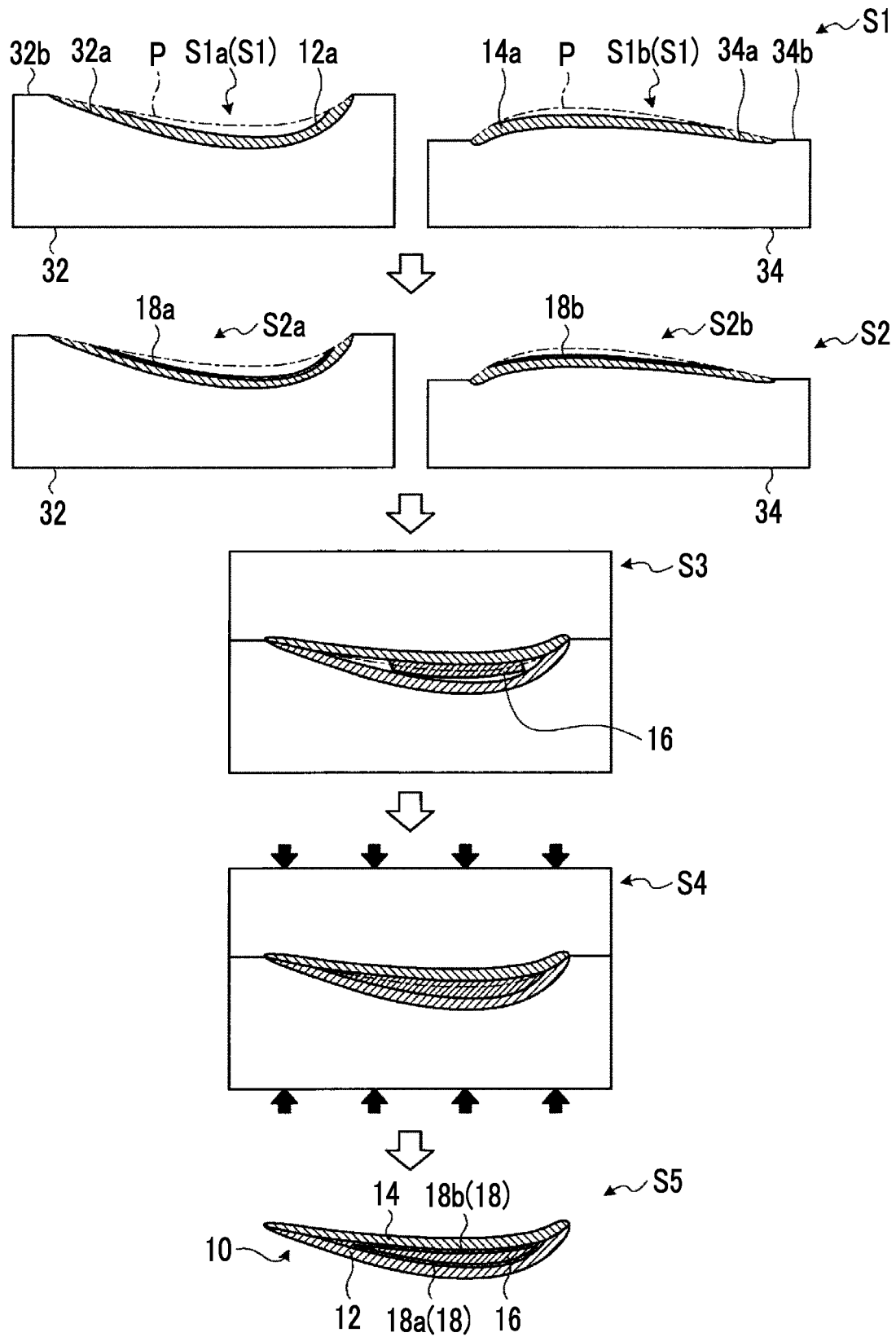
FIG. 7 is an explanatory diagram relating to the method for molding a composite blade according to Embodiment 1.

FIG. 1 is a plan view schematically showing a composite blade which is molded by the method for molding a composite blade according to Embodiment 1. FIG. 2 is a cross-sectional view schematically showing a thick part of the composite blade according to this embodiment and is a cross-sectional view taken along line A-A of FIG. 1. FIGS. 3 to 5 are schematic diagrams of an example showing a part of an inner surface cowl plate of the composite blade according to Embodiment 1. FIG. 6 is an explanatory diagram of a foaming agent which is used in the method for molding a composite blade according to Embodiment 1. FIG. 7 is an explanatory diagram relating to the method for molding a composite blade according to Embodiment 1.

First, prior to the description of the method of forming the composite blade 10, the composite blade 10 will be described. As shown in FIG. 1, the composite blade 10 is a turbine blade and extends from the blade root side, which is a fixed end toward the blade top side, which is a free end. Here, the direction connecting the blade root side and the blade top side is a blade length direction and is an L direction shown in FIG. 1. Further, in the composite blade 10, one side in the direction orthogonal to the blade length direction in FIG. 1 is a leading edge side and the other side is a trailing edge side. The direction connecting the leading edge side and the trailing edge side is a blade width direction and is a direction W shown in FIG. 1.

Further, as shown in FIG. 2, the composite blade 10 is formed to be curved in the blade width direction, and the side which is convex toward the outer side from the inner side of the composite blade 10 is the back side, and the side which is concave toward the outer side from the inner side of the composite blade 10 is the belly side. Here, the direction connecting the back side and the belly side is a blade thickness direction and is a direction T shown in FIG. 2.

In the composite blade 10, the thickness in the blade thickness direction becomes thicker on the blade root side and is formed to be thinner toward the blade top side. For this reason, in the composite blade 10, the blade top side has a thin portion in which the thickness in the blade thickness direction is thin, and the blade root side has a thick part 10b (refer to FIG. 2) in which the thickness in the blade thickness direction is thick.

A plurality of composite blades 10 are provided to be arranged at predetermined intervals in a circumferential direction on the outer periphery of a rotor which rotates around a shaft center. Then, a fluid flows from the leading edge side toward the trailing edge side between the composite blades 10.

As shown in FIG. 2, the composite blade 10 includes a suction-side blade member (suction-side part) 12 which is a part on the back side, a pressure-side blade member (pressure-side part) 14 which is a part on the belly side, an inner surface cowl plate (space retaining part) 18 which retains an internal space 20 which is formed by the suction-side blade member 12 and the pressure-side blade member 14, and a foaming agent 16 which is provided in the interior of the inner surface cowl plate 18.

The suction-side blade member 12 is formed by laminating a plurality of prepregs as reinforcement fiber preform materials in which reinforcement fibers are impregnated with resin, and thermally curing the prepregs. The suction-side blade member 12 is molded by a suction-side molding die 32 which will be described later. The suction-side blade member 12 is formed in a curved shape in which the outer surface of the composite blade 10 becomes convex. Further, the suction-side blade member 12 is formed in a curved shape in which the inner surface of the composite blade 10 becomes concave and serves as a part of the inner surface configuring the internal space 20.

The pressure-side blade member 14 is formed by laminating a plurality of prepregs as reinforcement fiber preform materials in which reinforcement fibers are impregnated with resin, and thermally curing the prepregs, similar to the suction-side blade member 12. The pressure-side blade member 14 is molded by a pressure-side molding die 34 which will be described later. The pressure-side blade member 14 is formed in a curved shape in which the outer surface of the composite blade 10 becomes concave. Further, the pressure-side blade member 14 is formed in a curved shape in which the inner surface of the composite blade 10 becomes convex and serves as a part of the inner surface configuring the internal space 20.

Then, both end parts in the blade width direction of the suction-side blade member 12 and both end parts in the blade width direction of the pressure-side blade member 14 are joined together at a neutral plane P which is a plane including the center in the blade thickness direction of the composite blade 10. Further, an inner surface between both end parts in the blade width direction of the suction-side blade member 12 and an inner surface between both end parts in the blade width direction of the pressure-side blade member 14 are formed apart from the neutral plane P toward the outer surface side, and the internal space 20 is formed by these inner surfaces. The internal space 20 is large on the blade root side of the composite blade 10 and becomes smaller toward the blade top side of the composite blade 10.

In this embodiment, the prepreg is used as the reinforcement fiber preform material. However, as long as it includes reinforcement fibers and resin, any material may be used. For example, as the reinforcement fibers, in addition to carbon fibers, glass fibers and aramid fibers may be applied. However, there is no limitation thereto, and plastic fibers or metal fibers may be used. Further, the resin is preferably a thermosetting resin. However, it may be a thermoplastic resin. As the thermosetting resin, epoxy resin, polyester resin, and vinyl ester resin are exemplified. As the thermoplastic resin, polyamide resin, polypropylene resin, ABS (Acrylonitrile Butadiene Styrene) resin, polyetheretherketone (PEEK), polyetherketoneketone (PEKK), polyphenylene sulfide (PPS), and the like are exemplified. However, the resin which is impregnated in the reinforcement fibers is not limited to these, and other resins may be used.

The inner surface cowl plate 18 is provided along the inner surface of the internal space 20. The inner surface cowl plate 18 is configured using, for example, the same prepreg as those of the suction-side blade member 12 and the pressure-side blade member 14. The inner surface cowl plate 18 is made of a cured composite material at the time of molding the composite blade 10. That is, the cured inner surface cowl plate 18 is applied at the time of assembling the composite blade 10. In Embodiment 1, the inner surface cowl plate 18 is configured using a prepreg. However, any material may be used. For example, it may be configured using only resin, and as the reinforcement fibers, high elastic resin fibers such as Kevlar (registered trademark) or Vectran (registered trademark) may be used.

Further, the inner surface cowl plate 18 is provided so as to cover the entire inner surface of the internal space 20. Both end parts of the inner surface cowl plate 18 in the blade width direction of the composite blade 10 are provided to be located closer to the internal space 20 side than both end parts of the composite blade 10. For this reason, at both end parts in the blade width direction of the composite blade 10, both end parts in the blade width direction of the suction-side blade member 12 and both end parts in the blade width direction of the pressure-side blade member 14 are respectively joined together.

The inner surface cowl plate 18 has heat resistance capable of retaining the internal space 20 at the time of the molding of the composite blade 10. Specifically, the inner surface cowl plate 18 has heat resistance serving as rigidity retaining the internal space 20 between a heating temperature at which the heating starts at the time of thermal curing and a foaming temperature at which a foaming agent 16 (described later) expands (foams) when molding the composite blade 10. For example, in the inner surface cowl plate 18, the glass transition temperature of the resin which is contained therein is 80° C. or higher and is equal to or higher than the curing temperature of the suction-side blade member 12 and the pressure-side blade member 14.

The inner surface cowl plate 18 described above includes a suction-side cowl plate 18a which is disposed on the suction-side blade member 12 and a pressure-side cowl plate 18b which is disposed on the pressure-side blade member 14. Further, the suction-side cowl plate 18a and the pressure-side cowl plate 18b are joined together through an adhesive 19 at both end parts in the blade width direction. The adhesive 19 is an adhesive film 19 sandwiched between the suction-side cowl plate 18a and the pressure-side cowl plate 18b at the time of the molding. The adhesive film 19 may be the same as the resin which is contained in the inner surface cowl plate 18 or may be an adhesive film which is bonded at normal temperature and is not particularly limited.

The suction-side cowl plate 18a and the pressure-side cowl plate 18b are molded by laminating and curing prepregs. The suction-side cowl plate 18a is formed in a curved shape in which the outer surface in contact with the suction-side blade member 12 becomes convex. Further, the suction-side cowl plate 18a is formed in a curved shape in which the inner surface in contact with the foaming agent 16 becomes concave. The thickness in the blade thickness direction of the suction-side cowl plate 18a is made to be constant in the blade length direction and the blade width direction. Further, the suction-side cowl plate 18a includes a prepreg in which, when the blade length direction of the composite blade 10 is set to be a reference direction, the fiber direction of the reinforcement fibers which are contained in the prepreg has an orientation of ±45° with respect to the reference direction. The suction-side cowl plate 18a includes such a prepreg, whereby the suction-side cowl plate 18a can have a structure with an elastic force applied thereto. The elastic force of the suction-side cowl plate 18a is such that the suction-side cowl plate 18a is bent when internal pressure (expansion pressure) is applied thereto due to the expansion of the foaming agent 16 at the time of the molding of the composite blade 10 and is capable of retaining the internal space 20 before the foaming agent 16 expands.

The pressure-side cowl plate 18b is formed in a curved shape in which the outer surface in contact with the pressure-side blade member 14 becomes concave. Further, the pressure-side cowl plate 18b is formed in a curved shape in which the inner surface in contact with the foaming agent 16 becomes convex. The thickness in the blade thickness direction of the pressure-side cowl plate 18b is made to be constant in the blade length direction and the blade width direction similar to the suction-side cowl plate 18a. Further, the pressure-side cowl plate 18b includes a prepreg in which, when the blade length direction of the composite blade 10 is set to be a reference direction, the fiber direction of the reinforcement fibers which are contained in the prepreg has an orientation of ±45° with respect to the reference direction, similar to the suction-side cowl plate 18a. The pressure-side cowl plate 18b includes such a prepreg, whereby the pressure-side cowl plate 18b can also have a structure with the same elastic force as that of the suction-side cowl plate 18a applied thereto.

Next, the structure of an end part in the blade width direction of the inner surface cowl plate 18 will be described with reference to FIGS. 3 to 5. The end part in the blade width direction of the inner surface cowl plate 18 is formed by bonding the end parts in the blade width direction of the suction-side cowl plate 18a and the pressure-side cowl plate 18b through the adhesive 19. That is, a bonding margin 21 is formed at each of the end parts in the blade width direction of the suction-side cowl plate 18a and the pressure-side cowl plate 18b, and the bonding margins 21 are joined together by the adhesive 19.

As an example of the end part of the inner surface cowl plate 18 shown in FIG. 3, the end part in the blade width direction of the suction-side cowl plate 18a is bent toward the outer surface side to form a bonding margin 21a on the inner surface side, and the end part in the blade width direction of the pressure-side cowl plate 18b is slightly bent toward the inner surface side to form a bonding margin 21b on the inner surface side. In this way, the bonding margins 21a and 21b of the suction-side cowl plate 18a and the pressure-side cowl plate 18b protrude to the outer side of the inner surface cowl plate 18.

As an example of the end part of the inner surface cowl plate 18 shown in FIG. 4, the end part in the blade width direction of the suction-side cowl plate 18a is folded back toward the inner surface side to form a bonding margin 21a on the outer surface side, and the end part in the blade width direction of the pressure-side cowl plate 18b is folded back toward the inner surface side to form a bonding margin 21b on the outer surface side. In this way, the bonding margins 21a and 21b of the suction-side cowl plate 18a and the pressure-side cowl plate 18b protrude to the inner side of the inner surface cowl plate 18.

As an example of the end part of the inner surface cowl plate 18 shown in FIG. 5, the end part in the blade width direction of the suction-side cowl plate 18a is folded back toward the inner surface side to form a bonding margin 21a on the outer surface side, and the inner surface side of the end part in the blade width direction of the pressure-side cowl plate 18b is used as a bonding margin 21b as it is. In this way, the bonding margins 21a of the suction-side cowl plate 18a protrudes to the inner side of the inner surface cowl plate 18 and is provided along the inner surface of the pressure-side cowl plate 18b.

The foaming agent 16 is filled in the interior of the inner surface cowl plate 18. The foaming agent 16 is disposed in the interior of the inner surface cowl plate 18 before foaming and then heated and foamed to be filled in the interior of the inner surface cowl plate 18. The foaming agent 16 filled in the interior of the inner surface cowl plate 18 is formed into a layered foam layer. As shown in FIG. 6, the foaming agent 16 is configured to include a resin component 25, a foaming component 26, and a fiber component 27. The resin component 25 is cured by being heated and may be the same as the resin which is contained in the reinforcement fiber preform material. The foaming component 26 is foamed by being heated, and the foaming component 26 is for example heated, thereby becoming carbon dioxide gas or the like and generating bubbles 28 in the resin component 25. The fiber component 27 is added such that the foaming by the foaming component 26 is in a stable foam form without unevenness.

In the foaming agent 16, the state shown in the left side of FIG. 6 is the state before foaming, and the foaming agent 16 which is in the state before foaming is heated to generate bubbles 28, thereby expanding the volume of the foaming agent 16, and after the volume expands, the resin component 25 is cured.

Next, the method for molding the composite blade 10 described above will be described with reference to FIG. 7. In the method for molding the composite blade 10 of this embodiment, a lay-up step S1, an inner surface cowl plate alignment step (space retaining part alignment step) S2, a mold set step S3, a curing step S4, and a demolding step S5 are performed in order.

In the lay-up step S1, a suction-side lay-up step S1a of forming a suction-side laminate 12a, which is a part of the suction-side blade member 12 before molding, and a pressure-side lay-up step S1b of forming a pressure-side laminate 14a, which is a part of the pressure-side blade member 14 before molding, are performed.

In the suction-side lay-up step S1a, a prepreg is laminated on the suction-side molding die 32 for molding the suction-side blade member 12 to form the suction-side laminate 12a. The suction-side molding die 32 has a suction-side molding surface 32a for molding the outer surface of the suction-side blade member 12, and a flat suction-side mold set surface 32b provided around the suction-side molding surface 32a. The suction-side molding surface 32a is formed to be recessed in a concave shape so as to mold the outer surface of the suction-side blade member 12 into a curved shape that is convex. In the suction-side lay-up step S1a, the suction-side molding die 32 is placed such that the suction-side molding surface 32a faces upward in the vertical direction. Then, a prepreg is laminated on the suction-side molding surface 32a of the suction-side molding die 32 to form the suction-side laminate 12a. In the suction-side lay-up step S1a, vacuuming is performed each time a few plies of prepregs are laminated, thereby forming the suction-side laminate 12a.

In the pressure-side lay-up step S1b, a prepreg is laminated on the pressure-side molding die 34 for molding the pressure-side blade member 14 to form the pressure-side laminate 14a. The pressure-side molding die 34 has a pressure-side molding surface 34a for molding the outer surface of the pressure-side blade member 14, and a flat pressure-side mold set surface 34b provided around the pressure-side molding surface 34a. The pressure-side molding surface 34a is formed to protrude in a convex shape so as to mold the outer surface of the pressure-side blade member 14 into a curved shape that is concave. In the pressure-side lay-up step S1b, the pressure-side molding die 34 is placed such that the pressure-side molding surface 34a faces upward in the vertical direction. Then, a prepreg is laminated on the pressure-side molding surface 34a of the pressure-side molding die 34 to form the pressure-side laminate 14a. In the pressure-side lay-up step S1b, similar to the suction-side lay-up step S1a, vacuuming is performed each time a few plies of prepregs are laminated, thereby forming the pressure-side laminate 14a.

In the inner surface cowl plate alignment step S2, a suction-side cowl plate alignment step S2a of disposing the suction-side cowl plate 18a on the suction-side laminate 12a and a pressure-side cowl plate alignment step S2b of disposing the pressure-side cowl plate 18b on the pressure-side laminate 14a are performed.

In the suction-side cowl plate alignment step S2a, the inner surface of the suction-side cowl plate 18a is placed upward in the vertical direction such that the outer surface of the suction-side cowl plate 18a is in contact with the suction-side laminate 12a.

In the pressure-side cowl plate alignment step S2b, the inner surface of the pressure-side cowl plate 18b is placed upward in the vertical direction such that the outer surface of the pressure-side cowl plate 18b is in contact with the pressure-side laminate 14a.

In Embodiment 1, the suction-side cowl plate 18a and the pressure-side cowl plate 18b are disposed in a state of being separate bodies. However, a configuration may be adopted in which the suction-side cowl plate 18a and the pressure-side cowl plate 18b are bonded to each other in advance with an adhesive and the integrated inner surface cowl plate 18 is disposed on the suction-side laminate 12a or the pressure-side laminate 14a.

In the mold set step S3, the suction-side molding die 32 and the pressure-side molding die 34 are die-matched and the foaming agent 16 is placed. Specifically, in the mold set step S3, the suction-side molding die 32 is disposed on the lower side in the vertical direction, and the pressure-side molding die 34 is disposed on the upper side in the vertical direction. Then, in the mold set step S3, the suction-side mold set surface 32b of the suction-side molding die 32 and the pressure-side mold set surface 34b of the pressure-side molding die 34 are superposed on each other, whereby the suction-side laminate 12a laminated on the suction-side molding die 32 and the pressure-side laminate 14a laminated on the pressure-side molding die 34 are superposed on each other on the neutral plane P. Further, when the suction-side laminate 12a and the pressure-side laminate 14a are superposed on each other, the bonding margin 21a of the suction-side cowl plate 18a and the bonding margin 21b of the pressure-side cowl plate 18b are caused to face each other and the adhesive film is sandwiched between the bonding margin 21a and the bonding margin 21b, whereby the inner surface cowl plate 18 is formed. In Embodiment 1, the end parts in the blade width direction of the suction-side cowl plate 18a and the pressure-side cowl plate 18b are bonded to each other. However, if it is necessary to bond the end parts in the blade length direction of the suction-side cowl plate 18a and the pressure-side cowl plate 18b, bonding margins may be formed at the end parts in the blade length direction and bonded to each other.

Then, in the mold set step S3, the hollow internal space 20 is formed by the suction-side laminate 12a and the pressure-side laminate 14a superposed on each other, and the inner surface cowl plate 18 is disposed on the inner surface of the internal space 20.

Further, in the mold set step S3, the foaming agent before foaming is installed in the interior of the inner surface cowl plate 18 prior to the superposition of the suction-side laminate 12a and the bell-side laminate 14a. The foaming agent 16 before foaming is formed in a sheet form. In the mold set step S3 of Embodiment 1, the suction-side molding die 32 is located on the lower side of the pressure-side molding die 34, and therefore, the foaming agent 16 before foaming is installed on the inner surface of the suction-side cowl plate 18a.

In the curing step S4, the suction-side laminate 12a, the pressure-side laminate 14a, and the foaming agent 16 are heated while the suction-side molding die 32 and the pressure-side molding die 34 are pressed in a direction approaching each other. In the curing step S4, due to the heating, the foaming component 26 of the foaming agent 16 foams before the resin of the resin component 25 of the foaming agent 16 and the resin of the prepreg (the suction-side laminate 12a and the pressure-side laminate 14a) are cured, while the internal space 20 is retained by the inner surface cowl plate 18. If the foaming component 26 foams, the bubbles 28 are formed due to the foaming components 26, whereby the resin component 25 before curing expands. For this reason, pressure (expansion pressure) is applied from the interior of the internal space 20 toward the outer side through the inner surface cowl plate 18 due to the expansion of the foaming agent 16, and therefore, the suction-side laminate 12a and the pressure-side laminate 14a before curing are pressed toward the suction-side molding die 32 and the pressure-side molding die 34 by the foaming agent 16. At this time, the internal space 20 is retained by the inner surface cowl plate 18, and therefore, the foaming agent 16 is suitably filled in the internal space 20 (the interior of the inner surface cowl plate 18). Then, after the foaming of the foaming component 26 of the foaming agent 16, the resin of the prepreg is cured first, or the resin of the resin component 25 of the foaming agent 16 and the resin of the prepreg are simultaneously cured, whereby the suction-side laminate 12a and the pressure-side laminate 14a are thermally cured in a state of being pressed by the foaming agent 16. Then, the resin component 25 of the foaming agent 16 is thermally cured after the curing of the resin of the prepreg or simultaneously with the curing of the resin of the prepreg, whereby the foaming agent 16 is integrated with the suction-side laminate 12a and the pressure-side laminate 14a. Then, the suction-side laminate 12a, the pressure-side laminate 14a, and the foaming agent 16 are cured, whereby the composite blade 10 is molded.

In the demolding step S5, the suction-side molding die 32 and the pressure-side molding die 34 are moved away from each other, whereby the molded composite blade 10 is released from the suction-side molding die 32 and the pressure-side molding die 34.

As described above, according to Embodiment 1, the inner surface cowl plate 18 is disposed, whereby it is possible to expand the foaming agent 16 while thermally curing the suction-side laminate 12a and the pressure-side laminate 14a in a state where the internal space 20 is retained. For this reason, the internal space 20 is retained by the inner surface cowl plate 18, and therefore, it is possible to suppress the flow of the prepregs of the suction-side laminate 12a and the pressure-side laminate 14a at the time of the thermal curing of the suction-side laminate 12a and the pressure-side laminate 14a. Therefore, it is possible to reduce undulation of the fibers, which is generated in the suction-side blade member 12 and the pressure-side blade member 14. Further, the internal space 20 is retained by the inner surface cowl plate 18, and therefore, the internal space 20 can be appropriately filled with the expanded foaming agent 16. Therefore, it is possible to appropriately adjust the thickness of the foaming agent 16. For this reason, it is possible to make the thickness in the lay-up direction of each of the suction-side blade member 12 and the pressure-side blade member 14 after the curing into the required thickness. In this way, it is possible to achieve the required flexural rigidity without reducing the flexural rigidity of the composite blade 10, and therefore, it is also possible to set the natural frequency of the composite blade 10 to the required natural frequency.

Further, according to Embodiment 1, the inner surface cowl plate 18 can be divided into the suction-side cowl plate 18a and the pressure-side cowl plate 18b, and therefore, it is possible to easily dispose the foaming agent 16 in the interior of the inner surface cowl plate 18.

Further, according to Embodiment 1, the entire inner surface of the internal space 20 can be retained by the inner surface cowl plate 18. Further, the expanding foaming agent 16 can press the entire inner surface of the internal space 20 which is formed by the suction-side laminate 12a and the pressure-side laminate 14a through the inner surface cowl plate 18.

Further, according to Embodiment 1, as the material of the inner surface cowl plate 18, a prepreg which is a composite material of the composite blade 10 can be used. For this reason, it is possible to perform thermal curing heating of the composite blade 10 without changing the heating conditions.

Further, according to Embodiment 1, it is possible to provide an elastic force to the inner surface cowl plate 18. For this reason, the inner surface cowl plate 18 is bent by the expansion pressure of the foaming agent 16 due to the elastic force thereof, and therefore, it is possible to suitably press the inner surface cowl plate 18 against the suction-side laminate 12a and the pressure-side laminate 14a.

Further, according to Embodiment 1, since the inner surface cowl plate 18 has heat resistance capable of retaining the internal space 20 between the heating temperature at the start of heating and the foaming temperature until the foaming agent 16 expands, the internal space 20 can be appropriately retained until the foaming agent 16 expands.

Further, according to Embodiment 1, the inner surface cowl plate 18 is located on the interior side of the composite blade 10 in the blade width direction, and therefore, even in a case where the inner surface cowl plate 18 is provided, it is possible to appropriately join the suction-side laminate 12a and the pressure-side laminate 14a together at both end parts in the blade width direction.

Further, according to Embodiment 1, since the suction-side molding die 32 is disposed on the lower side in the vertical direction and the pressure-side molding die 34 is disposed on the upper side in the vertical direction, the suction-side laminate 12a and the pressure-side laminate 14a are disposed in a curved state of being convex downward. For this reason, it is possible to exert hoop stress due to self-weight on the suction-side laminate 12a and pressure-side laminate 14a.

In Embodiment 1, the thickness in the blade thickness direction of each of the suction-side cowl plate 18a and the pressure-side cowl plate 18b is made to be constant in the blade length direction and the blade width direction. However, there is no limitation to this configuration. The thickness on the central portion side in the blade width direction of each of the suction-side cowl plate 18a and the pressure-side cowl plate 18b may be thinner than the thickness on the end part side. According to this configuration, the suction-side cowl plate 18a and the pressure-side cowl plate 18b become thinner toward the central portion from the end part in the blade width direction, whereby the rigidity in the blade width direction is kept constant, and in this way, the expansion pressure by the foaming agent 16 can be made uniform in the internal space 20.

Embodiment 2

Figure 8:
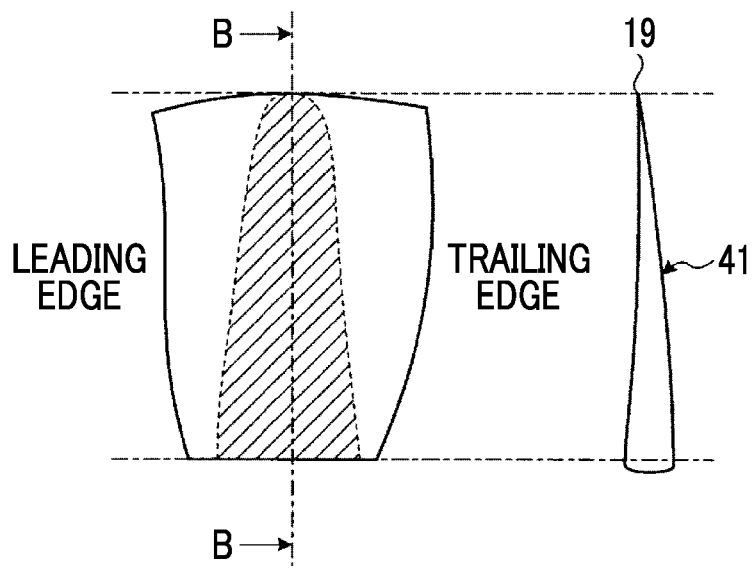
FIG. 8 is a schematic diagram showing an inner surface cowl plate of a composite blade according to Embodiment 2.

Next, a composite blade 10 according to Embodiment 2 will be described with reference to FIG. 8. In Embodiment 2, parts different from those in Embodiment 1 will be described to avoid overlapping description, and described parts having the same configurations as those in Embodiment 1 will be denoted by the same reference numerals. FIG. 8 is a schematic diagram showing an inner surface cowl plate of a composite blade according to Embodiment 2.

In the composite blade 10 of Embodiment 2, an inner surface cowl plate 41 thereof is disposed in an airfoil profile portion of the composite blade 10. The inner surface cowl plate 41 is continuous on the blade root side (the lower side in FIG. 8) and is joined on the blade top side (the upper side in FIG. 8). That is, the inner surface cowl plate 41 is a continuous plate which has one end part on the blade top side and extends from the blade top side to the blade root side, is folded back to the blade top side on the blade root side to extend from the blade root side to the blade top side, thereby having the other end part on the blade top side. Then, both end parts are bonded to each other by the adhesive 19 on the blade top side, whereby it becomes possible to handle the inner surface cowl plate 41 without dividing it. Also in Embodiment 2, similar to Embodiment 1, if it is necessary to bond the end parts in the blade width direction of the inner surface cowl plate 41, bonding margins may be formed at the end parts in the blade width direction and bonded to each other. In the inner surface cowl plate 41, the internal hollow space is wide at the end part on the blade root side, and the internal hollow space becomes narrower toward the end part on the blade top side.

As described above, according to Embodiment 2, the blade root side of the inner surface cowl plate 41 is a closed end part, and therefore, the foaming agent 16 disposed in the interior of the inner surface cowl plate 41 tends to flow to the blade top side at the time of expansion. In this way, the interior of the inner surface cowl plate 41 can be suitably filled with the foaming agent 16. Further, the blade root side of the inner surface cowl plate 41 is a closed end part, and therefore, even in a case where excessive compression acts in the blade thickness direction, it is possible to suppress the inflow of the foaming agent 16 into the blade root portion.

Embodiment 3

Figure 9:
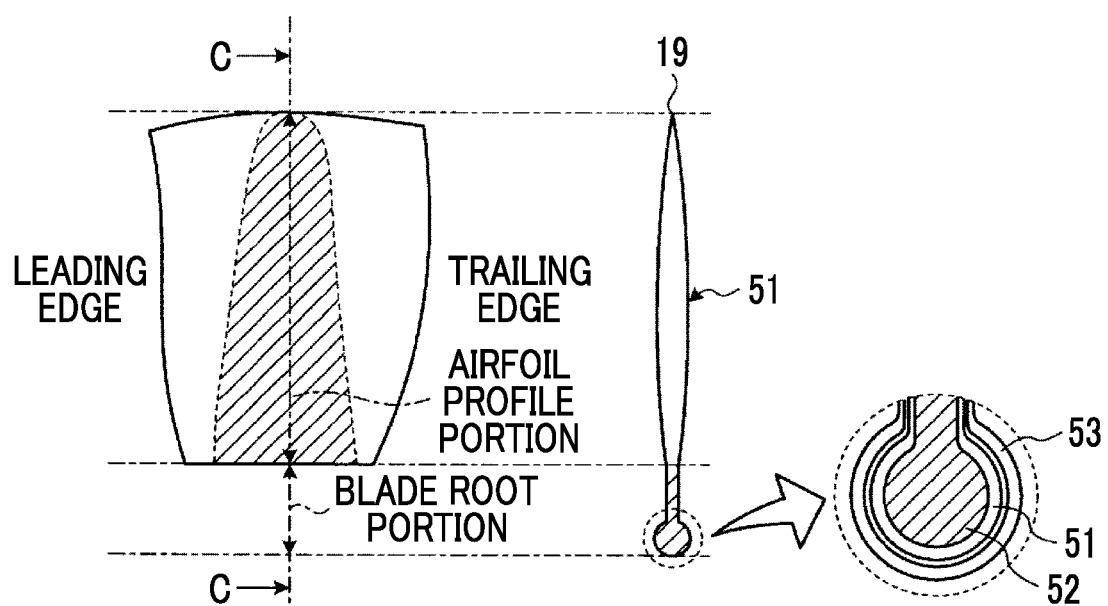
FIG. 9 is a schematic diagram showing an inner surface cowl plate of a composite blade according to Embodiment 3.

Next, a composite blade 10 according to Embodiment 3 will be described with reference to FIG. 9. Also in Embodiment 3, parts different from those in Embodiments 1 and 2 will be described to avoid overlapping description, and described parts having the same configurations as those in Embodiments 1 and 2 will be denoted by the same reference numerals. FIG. 9 is a schematic diagram showing an inner surface cowl plate of a composite blade according to Embodiment 3.

In the composite blade 10 of Embodiment 3, an inner surface cowl plate 51 is disposed over a range from an airfoil profile portion to a blade root portion of the composite blade 10. The inner surface cowl plate 51 is continuous on the blade root side (the lower side in FIG. 9) and is joined on the blade top side (the upper side in FIG. 9). That is, the inner surface cowl plate 51 is a continuous plate which has one end part on the blade top side, extends from the blade top side to the blade root side, is folded back to the blade top side on the blade root side to extend from the blade root side to the blade top side, thereby having the other end part on the blade top side. Then, both end parts are bonded to each other by the adhesive 19 on the blade top side, whereby it becomes possible to handle the inner surface cowl plate 51 without dividing it. Also in Embodiment 3, similar to Embodiment 1, if it is necessary to bond the end parts in the blade width direction of the inner surface cowl plate 51, bonding margins may be formed at the end parts in the blade width direction and bonded to each other. In the inner surface cowl plate 51, the end part on the blade root side is located in the interior of the blade root portion, and therefore, a core material 52 is disposed in the interior in the end part on the blade root side of the inner surface cowl plate 51.

The core material 52 is configured using lightweight metal, a cured composite material, or the like and is filled in advance in the interior in the end part on the blade root side of the inner surface cowl plate 51. Prepregs 53 of the suction-side laminate 12a and the pressure-side laminate 14a which are continuous from the airfoil profile portion are laminated so as to be wound on the outer surface side of the inner surface cowl plate 51 in which the interior is filled with the core material 52. That is, the prepreg 53 which is wound around the end part on the blade root side of the inner surface cowl plate 51 is continuous from the suction-side laminate 12a to the pressure-side laminate 14a.

The prepreg 53 in which, when the blade length direction is set to be a reference direction, the reinforcement fibers contained in the prepreg 53 have an orientation of ±45° with respect to the reference direction, and the prepreg 53 having an orientation of 0° are included in a plurality of laminated prepregs 53 configuring the inner surface cowl plate 51. The prepreg having an orientation of 0° is included, whereby a centrifugal load which is applied in the blade length direction can be borne by the inner surface cowl plate 51.

As described above, according to Embodiment 3, the end part on the blade root side of the inner surface cowl plate 51 can be located in the interior of the blade root portion of the composite blade 10. For this reason, it is possible to cause the end part on the blade root side of the inner surface cowl plate 51 to function as a retaining portion with respect to the centrifugal load which is applied in the blade length direction, and thus the inner surface cowl plate 51 can bear the centrifugal load.

Embodiment 4

Figure 10:
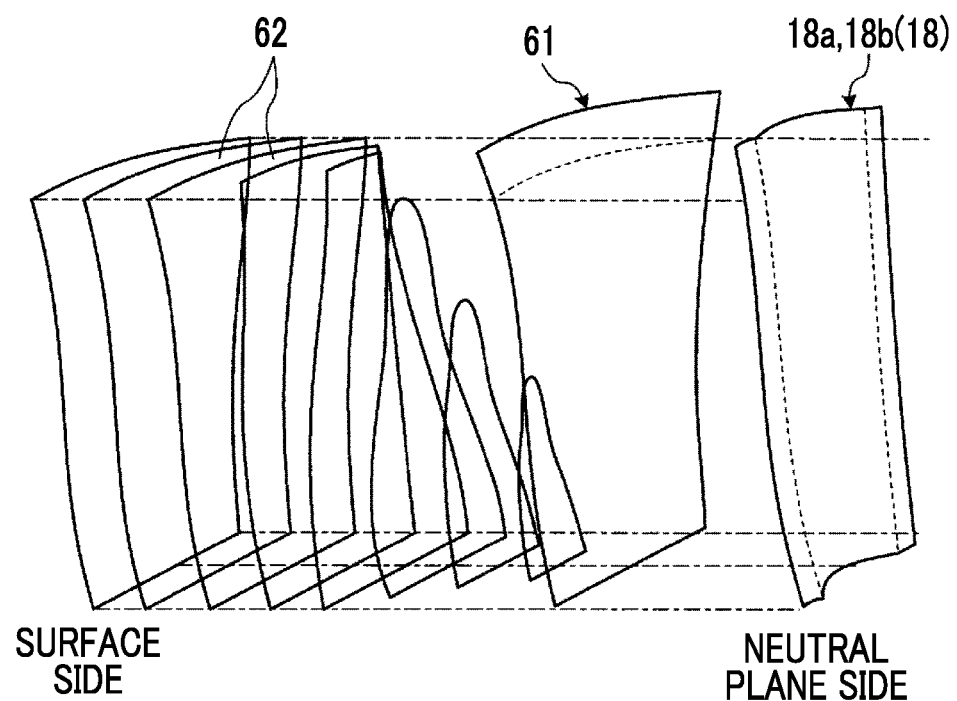
FIG. 10 is an explanatory diagram showing a laminated structure of a composite blade according to Embodiment 4.
Figure 11:
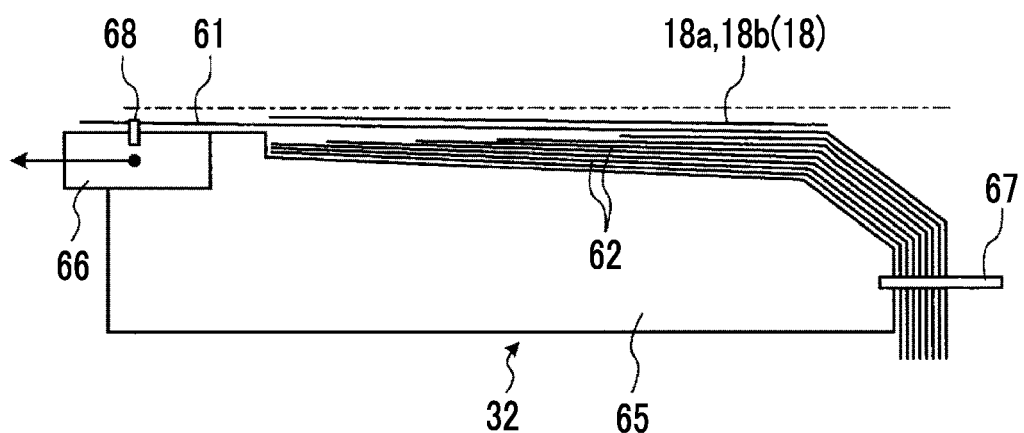
FIG. 11 is a schematic diagram showing a molding die for molding the composite blade according to Embodiment 4.

Next, a composite blade 10 according to Embodiment 4 will be described with reference to FIGS. 10 and 11. Also in Embodiment 4, parts different from those in Embodiments 1 to 3 will be described to avoid overlapping description, and described parts having the same configurations as those in Embodiments 1 to 3 will be denoted by the same reference numerals. FIG. 10 is an explanatory diagram showing a laminated structure of a composite blade according to Embodiment 4. FIG. 11 is a schematic diagram showing a molding die for molding the composite blade according to Embodiment 4.

In the composite blade 10 of Embodiment 4, each of the suction-side blade member 12 and the pressure-side blade member 14 which are formed by laminating a plurality of prepregs 62 has an innermost layer prepreg 61 which is provided on the internal space 20 side. That is, the innermost layer prepreg 61 is disposed between the suction-side blade member 12 (the suction-side laminate 12a) and the suction-side cowl plate 18a and between the pressure-side blade member 14 (the pressure-side laminate 14a) and the pressure-side cowl plate 18b in the blade thickness direction (the lay-up direction). In the innermost layer prepreg 61, the area thereof in a plane intersecting the lay-up direction of the prepreg 62 is the largest area among the prepregs 62 which are included in the suction-side blade member 12 and the pressure-side blade member 14. At this time, the innermost layer prepreg 61 is disposed such that the end part on the blade top side projects from the other prepregs 62. Then, in the innermost layer prepreg 61, tension is applied to the end part on the blade top side protruding from the other prepregs 62.

Further, the plurality of prepregs 62 are disposed such that the area intersecting the lay-up direction becomes smaller toward the innermost layer prepreg 61 from the outer surface side in the blade thickness direction. That is, the plurality of prepregs 62 are disposed side by side in the blade thickness direction such that the positions of the end parts on the blade top side are located on the blade root side from the outer surface side toward the innermost layer prepreg 61.

A case of molding the suction-side laminate 12a or the pressure-side laminate 14a each having the innermost layer prepreg 61 will be described as being applied to, for example, the suction-side molding die 32. The suction-side molding die 32 includes a molding die main body 65, a tension applying mechanism 66, a blade root-side fixing pin 67 for fixing the end part on the blade root side of the suction-side laminate 12a, and a blade tip fixing pin 68 for fixing the end part on the blade top side of the innermost layer prepreg 61 which is included in the suction-side laminate 12a.

In FIG. 11, the right-left direction thereof corresponds to the blade length direction of the suction-side molding die 32. As shown in FIG. 11, The molding die main body 65 has a suction-side molding surface for molding the outer surface of the suction-side blade member 12, and the blade root side of the suction-side molding surface has an inclined surface which is inclined toward the lower side in the vertical direction, and a side surface which is a vertical surface connected to the inclined surface. The suction-side laminate 12a is formed by laminating the plurality of prepregs 62 and the innermost layer prepreg 61 on the suction-side molding surface. At this time, since the suction-side molding surface side is the outer surface side of the suction-side laminate 12a, the plurality of prepregs 62 are laminated such that the area intersecting the lay-up direction becomes smaller toward the upper side in the vertical direction. Further, the end part on the blade root side of the suction-side laminate 12a is laminated along the inclined surface and the side surface. Then, the innermost layer prepreg 61 is disposed on the upper surfaces of the plurality of prepregs 62 so as to cover the entire surface of the plurality of prepregs 62. The suction-side cowl plate 18a is disposed on the upper surface of the innermost layer prepreg 61.

The tension applying mechanism 66 is provided on the blade top side of the suction-side laminate 12a which is laminated on the molding die main body 65, and moves outward in the horizontal direction with respect to the molding die main body 65. The end part on the blade top side of the innermost layer prepreg 61 of the suction-side laminate 12a is fixed to the tension applying mechanism 66.

The blade root-side fixing pin 67 is a pin for fixing the end part on the blade root side of the suction-side laminate 12a laminated on the molding die main body 65 to the side surface of the molding die main body 65, and penetrates the suction-side laminate 12a to be fixed to the molding die main body 65.

The blade tip fixing pin 68 is a pin for fixing the end part on the blade top side of the innermost layer prepreg 61 to the tension applying mechanism 66, and penetrates the suction-side laminate 12a to be fixed to the tension applying mechanism 66.

In the suction-side molding die 32, the end part on the blade root side of the suction-side laminate 12a is fixed thereto by the blade root-side fixing pin 67, the end part on the blade top side of the innermost layer prepreg 61 is fixed by the blade tip fixing pin 68, and the end part on the blade top side of the innermost layer prepreg 61 is pulled outward in the horizontal direction by the tension applying mechanism 66. In this way, the innermost layer prepreg 61 is tensioned to hold the plurality of prepregs 62 down, thereby suppressing the flow of the plurality of prepregs 62.

Above, the suction-side molding die 32 has been described. However, the pressure-side molding die 34 also has the same configuration, and therefore, description thereof is omitted.

As described above, according to Embodiment 4, by applying tension to the innermost layer prepreg 61, it is possible to suppress the flow of the prepreg 62 included in each of the suction-side laminate 12a and the pressure-side laminate 14a. For this reason, it is possible to reduce the undulation of the fibers which is generated in the suction-side blade member 12 and the pressure-side blade member 14. In this way, it is possible to set the flexural rigidity of the composite blade 10 to the required flexural rigidity, and therefore, it is also possible to set the natural frequency of the composite blade 10 to the required natural frequency.

In Embodiment 4, the inner surface cowl plate 18 (the suction-side cowl plate 18a and the pressure-side cowl plate 18b) is disposed. However, the inner surface cowl plate 18 may not be disposed, and the presence or absence of the inner surface cowl plate 18 is not particularly limited.

REFERENCE SIGNS LIST

10: composite blade
10b: thick part
12: suction-side blade member
12a: suction-side laminate
14: pressure-side blade member
14a: pressure-side laminate
16: foaming agent
18: inner surface cowl plate
18a: suction-side cowl plate
18b: pressure-side cowl plate
19: adhesive
20: internal space
21: bonding margin
21a: bonding margin of suction-side cowl plate
21b: bonding margin of pressure-side cowl plate
25: resin component
26: foaming component
27: fiber component
28: bubble
32: suction-side molding die
34: pressure-side molding die
41: inner surface cowl plate
51: inner surface cowl plate
52: core material
53: prepreg
61: innermost layer prepreg
62: prepreg
65: molding die main body
66: tension applying mechanism
67: blade root-side fixing pin
68: blade tip fixing pin

The invention claimed is:

1. A method for molding a composite blade, in which a composite blade made of a composite material is molded by curing a reinforcement fiber preform material in which reinforcement fibers are impregnated with resin, the reinforcement fiber preform material including a first reinforcement fiber preform material and a second reinforcement fiber preform material, and in the composite blade, a suction-side part which is a part on a back side and a pressure-side part which becomes a belly side are superposed on each other and joined together, the method comprising:

a lay-up step of forming a suction-side laminate by laminating the first reinforcement fiber preform material on a suction-side molding die for molding the suction-side part, and forming a pressure-side laminate by laminating the second reinforcement fiber preform material on a pressure-side molding die for molding the pressure-side part;

a space retaining part alignment step of disposing at least one space retaining part for retaining an internal space which is formed by superposing the suction-side laminate and the pressure-side laminate on each other;

a mold set step of die-matching the suction-side molding die and the pressure-side molding die such that the suction-side laminate and the pressure-side laminate are superposed on each other, and disposing a foaming agent in the internal space retained by the at least one space retaining part; and a curing step of pressing the suction-side laminate and the pressure-side laminate toward the suction-side molding die and the pressure-side molding die from inside by expanding the foaming agent through heating thereof, and heating and curing the suction-side laminate and the pressure-side laminate, wherein:

the foaming agent is in sheet form before expanding;

the at least one space retaining part includes a suction-side space retaining part which is disposed on the suction-side laminate, and a pressure-side space retaining part which is disposed on the pressure-side laminate;

in the space retaining part alignment step, the suction-side space retaining part and the pressure-side space retaining part are caused to face each other, an adhesive is disposed between an end part of the suction-side space retaining part in a blade width direction of the composite blade and an end part of the pressure-side space retaining part in the blade width direction of the composite blade, and the end part of the suction-side space retaining part and the end part of the pressure-side space retaining part are bonded to each other to form the at least one space retaining part; and a bonding margin is formed by bending at least one of the end part of the suction-side space retaining part or the end part of the pressure-side space retaining part.

2. The method according to claim 1, wherein, in each of the suction-side space retaining part and the pressure-side space retaining part, a thickness on a central portion side is thinner than a thickness on an end part side in the blade width direction of the composite blade.

3. The method according to claim 1, wherein the at least one space retaining part surrounds the internal space.

4. The method according to claim 1, wherein a resin material or a cured composite material is used as the at least one space retaining part.

5. The method according to claim 1, wherein:
a cured composite material is used as the at least one space retaining part; and
the at least one space retaining part include a third reinforcement fiber preform material in which a fiber direction of the reinforcement fibers which are contained in the composite material has an orientation of ±45° with a blade length direction of the composite blade as a reference.

6. The method according to claim 1, wherein the at least one space retaining part has heat resistance capable of retaining the internal space between a heating start temperature in the curing step and a temperature at which the foaming agent expands.

7. The method according to claim 1, wherein, in the space retaining part alignment step, in the blade width direction of the composite blade, the end part of the suction-side space retaining part and the end part of the pressure-side space retaining part are closer to the internal space than end parts of the composite blade.

8. The method according to claim 1, wherein, in the mold set step, the suction-side molding die is disposed on a lower side in a vertical direction and the pressure-side molding die is disposed on an upper side in the vertical direction.

9. The method according to claim 1, wherein:
each of the suction-side laminate and the pressure-side laminate has an innermost layer reinforcement fiber preform material which is provided on the internal space; and
in a plane intersecting a lay-up direction of the reinforcement fiber preform material, an area of the innermost layer reinforcement fiber preform material is largest among the first reinforcement fiber preform material and the second reinforcement fiber preform material which are included in the suction-side laminate and the pressure-side laminate.

10. The method according to claim 9, wherein, in the lay-up step, tension is applied to the innermost layer reinforcement fiber preform material in an in-plane direction intersecting the lay-up direction of the innermost layer reinforcement fiber preform material.

11. A method for molding a composite blade, in which a composite blade made of a composite material is molded by curing a reinforcement fiber preform material in which reinforcement fibers are impregnated with resin, the reinforcement fiber preform material including a first reinforcement fiber preform material and a second reinforcement fiber preform material, and in the composite blade, a suction-side part which is a part on a back side and a pressure-side part which becomes a belly side are superposed on each other and joined together, the method comprising:
a lay-up step of forming a suction-side laminate by laminating the first reinforcement fiber preform material on a suction-side molding die for molding the suction-side part, and of forming a pressure-side laminate by laminating the second reinforcement fiber preform material on a pressure-side molding die for molding the pressure-side part;
a space retaining part alignment step of disposing at least one space retaining part for retaining an internal space which is formed by superposing the suction-side laminate and the pressure-side laminate on each other;
a mold set step of die-matching the suction-side molding die and the pressure-side molding die such that the suction-side laminate and the pressure-side laminate are superposed on each other, and disposing a foaming agent in the internal space; and
a curing step of pressing the suction-side laminate and the pressure-side laminate toward the suction-side molding die and the pressure-side molding die from inside by expanding the foaming agent through heating thereof, and heating and curing the suction-side laminate and the pressure-side laminate,
wherein:
each of the suction-side laminate and the pressure-side laminate has an innermost layer reinforcement fiber preform material which is provided on the internal space;
in a plane intersecting a lay-up direction of the reinforcement fiber preform material, an area of the innermost layer reinforcement fiber preform material is largest among the first reinforcement fiber preform material and the second reinforcement fiber preform material which are included in the suction-side laminate and the pressure-side laminate;
in the lay-up step, tension is applied to the innermost layer reinforcement fiber preform material in an in-plane direction intersecting the lay-up direction of the innermost layer reinforcement fiber preform material;
the foaming agent is in sheet form before expanding;
the at least one space retaining part includes a suction-side space retaining part which is disposed on the suction-side laminate, and a pressure-side space retaining part which is disposed on the pressure-side laminate;
in the space retaining part alignment step, the suction-side space retaining part and the pressure-side space retaining part are caused to face each other, an adhesive is disposed between an end part of the suction-side space retaining part in a blade width direction of the composite blade and an end part of the pressure-side space retaining part in the blade width direction of the composite blade, and the end part of the suction-side space retaining part and the end part of the pressure-side space retaining part are bonded to each other to form the at least one space retaining part; and
a bonding margin is formed by bending at least one of the end part of the suction-side space retaining part or the end part of the pressure-side space retaining part.

* * * * *